United States Patent [19]

Hall et al.

[11] Patent Number: 4,604,106
[45] Date of Patent: Aug. 5, 1986

[54] COMPOSITE POLYCRYSTALLINE DIAMOND COMPACT

[75] Inventors: David R. Hall, Provo; Monte E. Russell; H. Tracy Hall, Jr., both of Orem, all of Utah

[73] Assignee: Smith International Inc., Irvine, Calif.

[21] Appl. No.: 728,177

[22] Filed: Apr. 29, 1985

Related U.S. Application Data

[63] Continuation-in-part of Ser. No. 600,399, Apr. 16, 1984, Pat. No. 4,525,178.

[51] Int. Cl.⁴ .............................................. B24D 7/14
[52] U.S. Cl. ...................................... 51/293; 51/295; 51/297
[58] Field of Search .................. 51/295, 297, 293, 309

[56] References Cited

U.S. PATENT DOCUMENTS

| | | | |
|---|---|---|---|
| 3,745,623 | 7/1973 | Wentorf | 29/95 |
| 4,215,999 | 8/1980 | Phaal | 51/295 |
| 4,229,186 | 10/1980 | Wilson | 51/297 |
| 4,252,102 | 2/1981 | Phaal et al. | 125/39 |
| 4,255,165 | 3/1981 | Dennis et al. | 51/309 |
| 4,303,442 | 12/1981 | Hara et al. | 75/243 |
| 4,370,149 | 1/1983 | Hara et al. | 51/309 |
| 4,411,672 | 10/1983 | Ishizuka | 51/309 |
| 4,525,178 | 6/1985 | Hall | 51/309 |

Primary Examiner—Paul Lieberman
Assistant Examiner—Willie J. Thompson
Attorney, Agent, or Firm—Willian, Brinks, Olds, Hofer, Gilson & Lione, Ltd.

[57] ABSTRACT

The invention is a composite polycrystalline diamond compact comprising at least one layer of diamond crystals and precemented carbide pieces which have been pressed under sufficient heat and pressure to create composite polycrystalline material wherein polycrystalline diamond and the precemented carbide pieces are interspersed in one another. Preferably, this composite material layer is disposed as a transition layer between the layer including the working surface of the compact and the substrate for the compact. In addition, the layer including the working surface may also be comprised of the composite material, with the general requirement that the volume percent of the polycrystalline diamond component in the layer including the working surface be higher than in the transition layer. Alternatively, the compact, rather than being divided into discrete layers, instead comprises a single layer of this composite material wherein the concentration of the polycrystalline diamond component is at its highest at the working surface of the compact and then decreases in the direction away from the working surface.

24 Claims, 6 Drawing Figures

COMPOSITE POLYCRYSTALLINE DIAMOND COMPACT

This application is a continuation-in-part of the application Ser. No. 600,399 filed April 16, 1984 by David R. Hall (now U.S. Pat. No. 4,525,178), the entire disclosure of which is incorporated herein by reference.

BACKGROUND OF THE INVENTION

1. Field of the Invention

This invention relates generally to wear and impact resistant bodies for use in cutting, machining, drilling and like operations, as well as for use as wear surfaces such as lapping stops, valve seats, nozzles, etc. More particularly, the invention relates to such bodies which comprise polycrystalline diamond and cemented metal carbide pressed at ultra high pressure and temperature.

As used in the following disclosure and claims, the term "polycrystalline diamond" along with its abbreviation "PCD" is intended to refer to the type of material which is made by subjecting individual diamond crystals to ultra high pressure and temperature such that intercrystalline bonding occurs. Generally, a catalyst/binder material is used to ensure adequate intercrystalline bonding. This material is also often referred to in the art as "sintered diamond".

Also, in the following disclosure and claims the term "precemented carbide" is intended to refer to the type of material resulting when grains of a carbide of one of the group IVB, VB, or VIB metals are pressed and heated (most often in the presence of a binder such as cobalt, nickel, or iron as well as various alloys thereof) to produce solid, integral pieces. The most common and readily available form of precemented carbide is tungsten carbide containing a cobalt binder.

2. Prior Art

In several applications, polycrystalline diamond has displayed particular advantages over single crystal diamond. In particular, PCD is more impact resistant than single crystal diamond. Single crystal diamond has relatively low impact resistance, due to its extremely high modulus of elasticity, as well as its specific planes of cleavage in which relatively low forces can cause fracturing of the crystal. PCD, on the other hand, which is made up of randomly oriented individual crystals, alleviates problems caused by the planes of cleavage in the single crystal form. However, PCD is still relatively low in impact resistance because of the high modulus of elasticity of diamond. This low impact resistance is a problem because, in many applications, PCD "wears" not from erosion of atomic layers, but rather from fracturing and spalling occurring at both macro and microscopic scales.

The relative brittleness of PCD was recognized early, and as a result the first commercially available PCD products included a metallic backing layer or substrate bonded directly to the diamond layer, as shown in U.S. Pat. No. 3,745,623. The most common form of this "composite compact" to date has been a planar disc of PCD sintered directly onto a precemented disc of tungsten carbide by means of a high pressure high temperature press cycle.

This arrangement, in which the PCD is supported by a single precemented carbide mass or similar substrate, has also provided advantages for the attachment of PCD. Diamond is relatively inert. As a result, it is difficult if not impossible to attach PCD to a tool support or other surface through conventional brazing techniques. Accordingly, providing PCD with a metallic backing which can itself be brazed provides a suitable means for brazing the PCD composite compact to a tool support.

Unfortunately, certain problems are found in the composite compacts produced as above, i.e. with a layer of PCD directly attached to a single planar substrate. One of these problems has been the limitation on the design of polycrystalline diamond tools to those configurations in which the diamond layer can be adequately supported by the carbide substrate. Although some work has been done to expand the possibilities (see for example U.S. Pat. No. 4,215,999 where a cylinder of polycrystalline diamond is sintered around a core of precemented carbide), there are conceivable uses for PCD in tools which are difficult or impossible to implement with the conventional composite compact. For example, rotary tools such as miniature grinding wheels and drills which need to be symmetrical about a line and in which the working faces are subject to tangential forces have not been commercially implemented.

Another problem arises because the precemented carbide substrate has a higher coefficient of thermal expansion than that of the PCD. Because the bond between the diamond layer and the precemented carbide substrate is formed when both materials are at a temperature in the range of 1,300° to 2,000° C., stresses are created when the composite compact cools and the carbide substrate shrinks more than the diamond. Because the diamond layer is less elastic than the carbide substrate, these stresses often cause cracking in the diamond layer, either during the cooling phase, during brazing, or during use of the composite compact.

Another limitation on the use of substrates for supporting or attaching PCD compacts is the requirement that the composition of the substrate be chemically compatible. In particular, it is important that the substrate material not be detrimentally reactive toward the diamond or the catalyst/binder material. For example, it has been difficult if not impossible to sinter PCD on a steel or other ferrous alloy substrate because of the strong tendency for the iron to dissolve or catalyze the graphitization of the diamond. This is unfortunate in that steel would otherwise be a good substrate material as it is easier to work with than cemented carbides. Steel also has a lower modulus of elasticity and would therefore be preferred in some applications such as rock bits and the like where high impact forces are encountered. Steel substrates would also be preferable in that they are easier to weld to and easier to install in a tool with a simple interference fit.

Furthermore, when a precemented carbide mass is relied on to increase the impact resistance of PCD, the diamond layer is preferably relatively thin so that the diamond is never too far from its support. This restriction on the thickness of the diamond layer naturally limits both the life expectancy of the composite compact in use as well as the designs for PCD diamond tools.

Yet another problem which has limited the thickness of the diamond layer in composite compacts is caused by the problem of "bridging". Bridging refers to the phenomenon that occurs when a fine powder is pressed from multiple directions. It is observed that the individual particles in a powder being pressed tend to stack up and form arches or "bridges" that the full amount of pressure often does not reach the center of the powder being pressed. The inventors have observed that when a 1 micron diamond powder is used to make a PCD compact which is more than about 0.06 inches thick, the PCD toward the center of the piece is usually not as well formed as the exterior portions of the compact. This condition can result in cracking and chipping of the diamond layer.

In the co-pending application Ser. No. 600,399, by David R. Hall, an improved PCD composite material is described which has partially alleviated some of the above-mentioned problems. In general, the material disclosed in that application comprises a mixture of diamond crystals and precemented carbide pieces which is pressed under sufficient heat and pressure to form a polycrystalline diamond matrix with cemented carbide dispersed therein, or alternatively a cemented carbide matrix with polycrystalline diamond dispersed therein. This composite PCD/cemented carbide material was found by the one of the inventors to have increased toughness over standard PCD, thus making it attractive for high impact uses such as earth boring, cement sawing, and the like.

Also, the addition of the precemented carbide pieces to the PCD was found beneficial to the properties of composite compacts with a cemented carbide backing. In particular, the stresses at the interface between the PCD layer and the backing caused by the differing coefficients of thermal expansion are reduced because the presence of the cemented carbide pieces dispersed within the PCD layer tends to make the thermal expansion properties of the PCD layer more like that of the backing.

In addition, the inclusion of the pieces of cemented carbide to the PCD was found to lessen the problems caused by bridging. In particular, the precemented pieces of carbide did not compress appreciably and thereby improved the pressure distribution in the pressing cell. Accordingly, the new composite PCD material could be better pressed in thicker pieces.

Although at certain low concentrations of dispersed cemented carbide the wear resistance of this composite material was surprisingly higher than standard PCD, generally the wear resistance was less than that of standard PCD. As could be expected, the higher concentrations of cemented carbide possess lower wear resistance. In many applications, this compromise of the wear resistance of the PCD body in order to achieve increased toughness is acceptable. However, it would certainly be desirable to have the optimum of both wear resistance and impact resistance in each compact. Also, in certain wear part applications, such as PCD bearings, it is important that the surface of the PCD part be homogeneous so that the surface can wear at a uniform rate.

SUMMARY OF THE INVENTION

The invention is a composite body comprising polycrystalline diamond and cemented carbide for engaging a work material. The composite body has a first layer which has an exposed surface adapted for contacting the work material. This layer comprises polycrystalline diamond, i.e. a quantity of diamond crystals which has been pressed under sufficient heat and pressure to cause adjacent diamond crystals to bond together. The composite body also has a second layer which is adjacent to the first layer and comprises a mixture of polycrystalline diamond and cemented carbide, i.e. a mixture of diamond crystals and pieces of precemented carbide which has been pressed under sufficient heat and pressure to cause adjacent diamond crystals to bond to each other and to the precemented carbide pieces, whereby the diamond crystals and the precemented carbide pieces are interspersed in one another, with either the carbide pieces or the diamond crystals providing a matrix for the composite material.

In accord with one embodiment of the present invention, the first layer also comprises precemented carbide, but in a lower concentration than the second layer. That is, the volume percent of PCD in the first layer is greater than the volume percent of PCD in the second layer.

In accord with another embodiment of the present invention, a third layer is added to the composite polycrystalline body. This third layer would be adjacent to the second layer and comprise PCD and precemented carbide with a lower concentration of diamond than in the second layer.

In accord with another embodiment of the present invention, the volume percent of PCD is not uniform through each of the two layers. Rather, in the first layer, the volume percent of PCD is highest when measured at the exposed or working surface (most preferably 100%) and then gradually decreases toward the interface with the second layer. Likewise, in the second layer, the volume percent of PCD is highest at the interface with the first layer and decreases when moving away from the interface. In the most preferred form of this embodiment, the boundary between the two layers is nondistinct. That is, the volume percent of diamond together with the way that it changes through each layer is selected so that the volume percent of diamond in the first layer at the interface is only slightly greater than or even equal to the volume percent of diamond in the second layer at the interface. Consequently, this embodiment can also be defined as having only one polycrystalline layer with a decreasing volume percent of diamond in the direction away from the exposed surface. Alternatively, this same embodiment could be defined as having several thin layers with the exposed layer having the highest volume percent of diamond and the other layers each decreasing slightly in diamond concentration.

In accord with still another embodiment of the present invention, the composite body comprises more than two distinct layers. In this embodiment, each layer has a relatively uniform volume percent of diamond with the exposed layer having the highest.

In accord with yet another embodiment of the present invention, the composite body also comprises a substrate. Such a substrate can comprise cemented carbide, steel, or other metallic, ceramic, or cermet materials. In one preferred embodiment, the substrate consists of cemented tungsten carbide. In another preferred embodiment, the substrate consists of steel or another ferrous alloy and the composite body further comprises a barrier layer of precemented carbide disposed between the substrate and the closest layer including PCD.

In accord with yet another embodiment of the present invention, the layer possessing the exposed surface for engaging the work material is sandwiched between two layers of PCD/carbide composite material. This particular embodiment is useful in applications such as an insert for a spade drill wherein the cutting edge extends from the middle layer and two side layers of composite material would support and facilitate attachment of the spade drill insert into a drill shaft.

DETAILED DESCRIPTION

Figure 1:
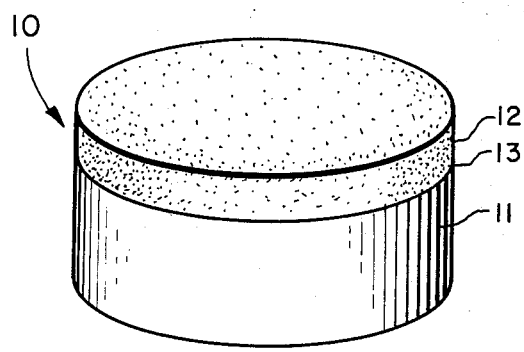
FIG. 1 illustrates an example of a prior art composite compact.

Turning now to the drawings, FIG. 1 illustrates a prior art composite compact 10 which is made up of a layer 12 of polycrystalline diamond supported by a cemented carbide backing or substrate 11. See for example U.S. Pat. No. 3,745,623. The diamond layer 12 is comprised of individual diamond crystals that have been subjected to sufficient heat and pressure to cause intercrystalline bonding. The cemented carbide backing 11 is intimately bonded to the diamond layer 12 at the interface 13. There is a strong chemical bond formed during the press cycle at the interface 13 between the two layers 11 and 12. Because the cemented carbide backing 11 shrinks more upon cooling than the diamond layer 12, residual stresses are set up between the two layers which can cause premature cracking in the diamond layer.

Figure 2:
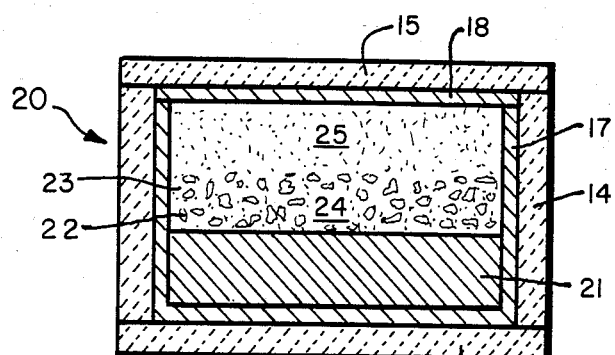
FIG. 2 is a cross-sectional view of a sample cell used to fabricate an embodiment of the composite polycrystalline body of the present invention.

FIG. 2 shows a cross-section of a pressing unit 20 that may be employed to make the composite polycrystalline diamond body of the present invention. The pressing unit 20 is cylindrical in shape and is designed to fit within the central cavity of an ultra high pressure and temperature cell such as that described in U.S. Pat. No. 3,913,280 (for use in cubic presses) or U.S. Pat. No. 3,745,623 (for us in "belt" type presses). The pressing unit 20 includes a hollow tube 14 with discs 15 and 16 located at the top and bottom of the tube 14. The tube 14 and discs 15 and 16 function as a plastic pressure transmitting medium and preferably consist of pressed NaCl, although talc or hexagonal boron nitride may also be used.

Within the tube 14 is a protective metal enclosure 17 which is also cylindrical in shape and closed at the bottom end. This enclosure 17 is preferably made from molybdenum because of its high melting temperature, but other metals such as zirconium or tantalum also work well. A disc 18, usually comprising the same metal as the enclosure 17, is placed as a lid on the top of the enclosure 17.

A substrate 21 is placed in the bottom of the enclosure 17. This substrate comprises cemented tungsten carbide with a cobalt binder in this preferred embodiment. Substrates with this composition have proven to be chemically compatible with many of the catalyst/binder systems utilized to form polycrystalline diamond. Also, substrates comprising other metallic, ceramic, or cermet compositions may be employed. For example, steel or another ferrous alloy may be used. However when using steel or any other material which is chemically reactive or otherwise incompatible with the system used to produce the PCD, it is desirable to include an additional layer to serve as a barrier between the substrate and the diamond. A layer consisting of grains of precemented carbide has been successfully used in this capacity. This substrate 21 may serve a supporting function for the compact produced. Also, the substrate 21 may be used for attaching the compact to a tool.

Adjacent to the substrate 21 is a transition layer 24 comprising a mixture of pieces of precemented carbide 22 and diamond crystals 23 together with a catalyst/binder material for the formation of polycrystalline diamond. This mixture may be produced by ball milling the precemented carbide pieces 22 with the diamond crystals 23 and a suitable catalyst/binder material together. The mixture can then be poured into the metal enclosure 17 on top of the substrate 21. In this preferred embodiment, the proportions of the diamond crystals 23 and the precemented carbide pieces 22 can be expressed as the carbide pieces occupying approximately 60 volume percent of this transition layer. In other words, the diamond along with its catalyst/binder occupies approximately 40 volume percent.

The pieces of precemented carbide 22 comprise cemented tungsten carbide with a cobalt binder. At present, for reasons of chemical compatibility it is considered to be preferable to have the pieces of precemented carbide 22 to have the same composition including the binder phase as the substrate 21. However, it may alternatively be desirable to vary the binder content in the precemented carbide pieces to produce different properties, such as the modulus of elasticity, of the pieces 22 than those of the substrate 21. Likewise, in alternative embodiments with more than one transition layer, the binder content or tungsten carbide grain size within the cemented carbide pieces could be varied from layer to layer to accomplish this same result.

The size and shape of the pieces of precemented carbide 22 can be varied to achieve different results. The shape can be regular or irregular. In that the most economical source of precemented carbide pieces is in the form of crushed grit, or flame-sprayed presintered grit, irregular shaped pieces are presently preferred. For convenience and clarity in the drawings, the size of the pieces of carbide 22 have been exaggerated in this and other drawings over that which is preferable. Actually, it is preferable to use carbide pieces that would be too small to be seen without magnification. In particular, a grit size of minus 325 U.S. mesh is presently preferred. In addition, it is deemed preferable to use carbide pieces that are significantly larger than the diamond crystals in order to lessen the degree to which the carbide pieces interfere with the formation of diamond to diamond bonding.

The size of the diamond crystals 23 used can also be varied by well known means to suit the needs of particular applications. In this preferred embodiment, a mixture of diamonds from 1 to 100 microns is used, most preferably 4 to 12 microns. Various catalyst/binder materials for the formation of PCD are well known in the art. In this preferred embodiment a catalyst/binder is mixed with the diamond crystals which comprises cobalt powder and is present in a 1 to 10 volumetric ratio with the diamond cobalt mixture.

Alternatively, the catalyst for bonding the crystals together in this layer 24 may be derived entirely from the binder present in the precemented carbide pieces. In other words, the cobalt or other binder in the precemented carbide pieces 22 may extrude out of the precemented pieces during the press cycle in sufficient quantity to function as the catalyst/binder for the diamond crystals 23.

Adjacent to the mixture just described, is another layer 25 comprising a quantity of diamond crystals together with a suitable catalyst/binder material, preferably the same catalyst/binder material as in the transition layer. Again, the catalyst binder in this layer 25 may alternatively be either partially or entirely provided from the binder which migrates from the precemented carbide pieces 22. This layer 25 can be simply poured into the metal enclosure 17 on top of the transition layer 24. This layer 25 will include the exposed or working surface of the composite compact produced.

In this embodiment, the diamond crystals are present in a mixture of sizes equivalent to that in the transition layer. However, because this layer will include the working surfaces of the ultimate compact, it may be desirable to vary the particle sizes of the diamond to suit a particular application. For example, it may be preferable to use fine diamond crystals, such as 0 to 5 microns, to improve the finish of the exposed surface for such applications as precision grinding or wire drawing, etc. It may further be desirable to include two or more layers of diamond crystals with the top layer comprising the smallest crystals.

Figure 3:
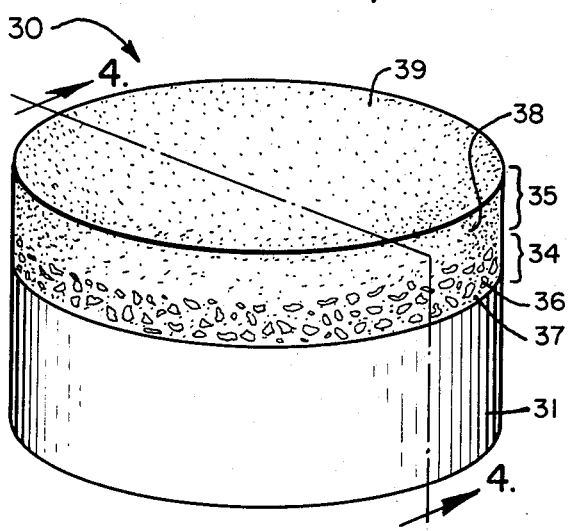
FIG. 3 is a perspective view of a composite compact made according to an embodiment of the present invention.

FIG. 3 is a perspective view of a composite body 30 made according to the present invention. The body 30, which is suitable for cutting, grinding, crushing, machining, as well as other applications requiring extreme wear resistance and impact resistance such as in bearings; includes a substrate 31. The substrate shown here comprises a precemented disc of cobalt bonded tungsten carbide. As mentioned above, other materials may also be used for the substrate 31. In several applications, the substrate 31 is brazed to a tool holder or other support.

Directly adjacent to the substrate 31 is a transition layer 34. The transition layer 34 comprises an integrally bonded mixture of polycrystalline diamond 37 and precemented carbide pieces 36 (preferably much smaller than illustrated). In particular, the transition layer 34 comprises a mixture of diamond crystals together with a catalyst/binder material and pieces of precemented carbide which has been pressed under sufficient heat and pressure to cause the adjacent diamond crystals to bond to each other and to the precemented carbide pieces. The transition layer 34 also comprises an amount of residual catalyst/binder material left in polycrystalline structure after pressing. The preferred concentration of polycrystalline diamond (including any pores and residual catalyst/binder) in the transition layer 34 is between 20 and 60%, and most preferably is about 40%. However, for various reasons, which are discussed in the co-pending application Ser. No. 600,399, this concentration can be adjusted up or down to suit particular applications.

Directly adjacent to the transition layer 34 is a top (as here drawn) layer 35 which includes the exposed or working surface 39. This top layer 35 comprises polycrystalline diamond 38. In particular, the PCD 38 is formed from a quantity of diamond crystals in combination with a catalyst/binder material that has been pressed under sufficient heat and pressure to cause the adjacent diamond crystals to bond together. Preferably, the catalyst/binder material is a cobalt powder and is present in this top layer 35 and the transition layer 34 in a 1 to 10 volumetric ratio with the diamond. Alternatively, the catalyst binder for this top layer 35 can be derived either partially or entirely from the binder which has migrated from the transition layer 34.

Figure 4:
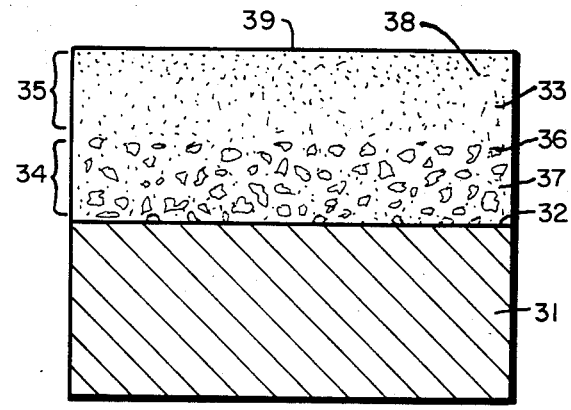
FIG. 4 is a cross-sectional view taken along line 4—4 of FIG. 3.

FIG. 4 is a cross section taken along line 4—4 of FIG. 3. The transition layer 34 meets the substrate 31 at an interface 32. As mentioned above, in the typical prior art composite compact, the interface between the substrate and the PCD layer is a potentially weak point in the structure because of the stresses that can occur due to the thermal expansion differential. However, with the transition layer 34 of the present invention, the thermal expansion problems are moderated by virtue of the fact that the transition layer as a whole will have thermal expansion characteristics somewhere between those of the cemented carbide substrate 31 and the polycrystalline layer 35. That is, during the cooling stage after the pressing of the compact 30, the transition layer should shrink more than the PCD layer 35 but less than the substrate 31. As a result, the strain to the composite compact's structure is greatly reduced, particularly at the interface 32.

This is an important advantage. In the inventors' experience, the differing shrinkage rates between the cemented carbide substrate and the PCD layer in the prior art compacts caused cracking in the PCD layer which resulted in a rejection rate as high as 30%. In contrast, batches of composite compacts made with a transition layer according to this invention have showed a rejection rate due to cracking of 5% or less.

FIG. 4 also demonstrates another advantage of the present invention. As can be seen, at the interface 32 between the substrate 31 and the transition layer 34, there will be a number of the precemented carbide pieces 36 adjacent to the substrate 31. During the press cycle, these adjacent carbide pieces fuse to the substrate 31. As a result, the interface between carbide and polycrystalline diamond is made non-planar. In this way, potential stresses between the carbide substrate and the PCD are further reduced.

Another important advantage of the present invention is the fact that it has made it possible to achieve the benefits of the composite PCD/carbide material while retaining a working surface of 100% PCD. This is advantageous as it alleviates some of the problems of the prior art PCD compacts while maintaining the maximum wear resistance possible. The 100% PCD working surface is particularly important in applications such as bearings where a homogeneous surface is most desirable.

Figure 5:
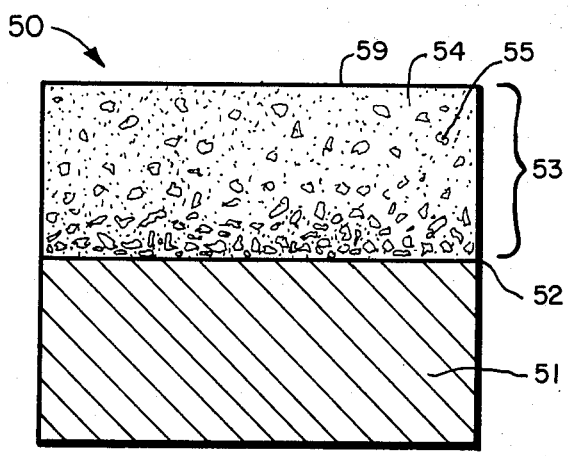
FIG. 5 is a cross-sectional view of another embodiment wherein the the volume percent of diamond decreases in the direction away from the exposed surface.

FIG. 5 is a cross section of a composite compact 50 made according to another embodiment of the present invention. In particular, this embodiment, rather than having two distinct polycrystalline layers, has one polycrystalline layer 53 which comprises a mixture of PCD 54 and precemented carbide 55. The concentration of the PCD is highest at the exposed or working surface 59. Preferably, the concentration of PCD 54 is 100 volume percent (including residual catalyst binder material) as shown here. The concentration of PCD 54 then gradually decreases on a gradient in the direction away from the exposed surface and toward the interface 52 with the substrate 51. In other words, there is an increase in the volume percent of precemented carbide as one moves in this same direction. Most preferably, the volume percent of PCD 54 would be at or near 0% at the interface 52.

In the alternative, this embodiment can be defined as having several thin layers each of which decreases in PCD concentration when moving away from the layer including the exposed or working surface 59. In practice, this is the easiest way to achieve this embodiment. That is, the gradual transition can be produced by sequentially placing several thin layers of increasing polycrystalline diamond concentration into the pressing cell to make the graduated compact 50.

Another method of producing a graduated compact 50 involves the use of carefully controlled and changing addition rates of the diamond and the precemented carbide pieces to the pressing cell. Still another method involves the use of carefully controlled centrifugation of diamond and precemented carbide mixtures. This centrifugation method may require a dispersion medium such as acetone which could be easily removed prior to pressing.

Figure 6:
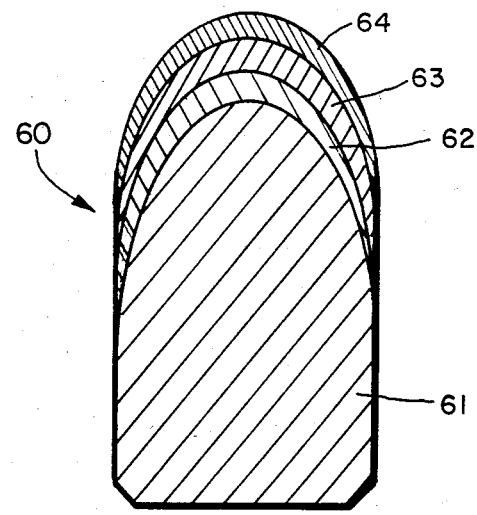
FIG. 6 is a cross-sectional view of an insert for a roller cone rock bit made according to yet another embodiment of the present invention.

FIG. 6 is a cross section of an insert 60 for use in a roller cone rock bit which has been made according to yet another embodiment of the present invention. The insert 60 includes a substrate or insert body 61. In the preferred embodiment for this insert, the insert body 61 is made of steel. Steel is preferable to cemented carbide in that steel is easier to fabricate, can be attached by welding, and has a lower modulus of elasticity thereby making the insert more impact resistant and better able to be attached by interference fit into a bit. By well-known techniques the insert body 61 is appropriately shaped to be suitable for use in the particular cutting structure of a roller cone rock bit.

Directly adjacent to the insert body 61 is a barrier layer 62. In this case, the barrier layer consists of precemented tungsten carbide grit which has been fused together during the press cycle. This layer serves the important function of separating the polycrystalline diamond from the steel. This is necessary because of the strong tendency of the iron from the steel to dissolve and thereby catalyze the graphitization of the diamond. This result would otherwise occur during the press cycle if the iron were allowed to come in contact with the diamond. It is likewise important to keep the steel separate from the polycrystalline diamond during use of the compact, as elevated temperatures encountered during use would also produce graphitization if the PCD were adjacent to the steel.

Inasmuch as CBN is known to have a low solubility in molten ferrous alloys an alternative embodiment incorporating a transition layer of polycrystalline CBN (sintered during the press cycle) as a barrier to carbon diffusion may be desirable.

This separating function would likewise be served by a polycrystalline layer as shown in FIG. 5. That is, if the graduated concentration of precemented carbide pieces has reached 100% before contacting the substrate, it is possible to use steel, another ferrous alloy, or another otherwise incompatible material for the substrate.

In turn, a transition layer 63 is directly adjacent to the barrier layer 62. This transition layer comprises a mixture of precemented carbide pieces and diamond crystals which have been pressed at sufficient heat and pressure to produce an interspersed matrix of cemented carbide and polycrystalline diamond. Preferably, this transition layer would comprise about 40 volume percent PCD.

Directly adjacent to the transition layer 63 is the working layer 64. This layer 64 includes the working surface 65 which will actually contact the rock to be cut or crushed. This layer 64 comprises another mixture of cemented carbide and PCD as in the transition layer. In this layer, however, the PCD is in a higher volume percent, preferably 60%. Because of the extreme impact forces on the inserts in rock drilling application, it is currently preferred to have the working layer include pieces of precemented carbide. It has also been observed that a transition layer with a higher concentration of carbide is beneficial in improving the insert's capacity to withstand high impact forces.

To apply these layers 62, 63, and 64 to the insert body 61 prior to pressing, it may be necessary to use a minor amount of a temporary binding material such as paraffin to hold the layers in place for pressing. It has been noted however, that these mixtures will to a certain extent adhere and stay in place without such a temporary binder. This is possibly due to the presence of the cobalt powder catalyst/binder material or perhaps to the fineness of the powders.

EXAMPLES

EXAMPLE 1

A cemented carbide substrate was placed in the bottom of a pressing unit as described above. The substrate was a presintered disc of tungsten carbide with a cobalt binder present as 14 weight percent of the disc. The disc was obtained from Tungsten Carbide Manufacturing Inc. and bore a composition code number of 614.

A mixture of diamond crystals, catalyst/binder material, and precemented carbide pieces was obtained by thoroughly milling diamond, cobalt powder and pieces of precemented tungsten carbide grit in a tungsten carbide lined ball mill. The resultant mixture had a particle size of diamonds of 65% at 4-8 microns, and 35% at 0.5-1 micron. A catalyst binder in the form of a cobalt powder was included as 13 weight percent of the diamond cobalt mixture. The precemented carbide pieces had an average size of 30 microns and a cobalt binder content of 11%. The precemented carbide pieces comprised 60 volume percent of this mixture.

This mixture along with all other mixtures in these examples was cleaned and reduced by treating alternately with hydrogen gas and vacuum at 800° C. A 0.4 mm (0.015 inch) layer of this mixture was poured on top of the substrate.

Next a mixture of diamond crystals and cobalt powder, with similar particle sizes and cobalt content to that of the transition layer, was poured on top of the transition layer. This top layer was also 0.4 mm thick.

The pressing cell was placed between the anvils of a cubic press and pressurized to about 60 kbars and heated to about 1450° C. for approximately 2 minutes. The pressure and heat were reduced and the cell was allowed to cool.

The compact recovered showed no signs of cracking. In a wear test against a turning granite log, the compact showed showed wear resistance similar to standard PCD compacts.

EXAMPLE 2

A compact was produced as in Example 1 with the exception that the top layer included precemented carbide pieces in an amount of 40 volume percent of the layer. The compact recovered also showed no signs of cracking.

EXAMPLE 3

A compact was produced as in Example 1 with the exception that four layers were formed on top of a steel substrate. In particular, a 0.25 mm thick layer consisting of precemented tungsten carbide grit (i.e. 100 volume percent) was placed on a steel substrate. Next, a layer of similar thickness consisting of 60 volume percent precemented tungsten carbide grit and 40 volume percent diamond crystals with cobalt binder was placed in the cell. On top of that, a 0.25 mm thick layer consisting of 40 volume percent precemented tungsten carbide grit and 60 volume percent diamond with its cobalt binder. Finally, the top layer was added which consisted of 100 volume percent diamond with its cobalt binder. The compact recovered showed no signs of cracking. In addition, there appeared to be no negative effects of using the steel substrate.

It should be noted that although all of the embodiments illustrated have included a substrate, there are many applications for the PCD composite compacts of the present invention which will not require such a substrate. Indeed, the present invention offers the advantage that the carbide containing transition layer can be directly brazed to a support. That is, it is possible to braze directly to the transition layer because the braze can attach to the pieces of carbide in the composite material.

It should also be noted that although all of the illustrated embodiments have shown a working surface which constitutes a major surface of the compact, it is also possible to have a working surface which is a minor surface of the compact. For example, in fabricating an insert for a spade drill, a cutting layer comprising a higher concentration of PCD is flanked on its two major sides by composite layers with lower concentrations of PCD. The cutting layer would extend above the side layers and be supported by them. In addition, the side layers could be used to facilitate attachment of the spade drill insert into the drill shaft.

Certainly, these as well as all other variations within the ordinary skill of one in the art are considered within the scope of the invention as defined in the following claims.

What is claimed is:

1. A composite polycrystalline body for engaging a work material comprising:
    a first layer with at least one exposed surface adapted for contacting the work material, said first layer comprising diamond crystals pressed under sufficient heat and pressure to create polycrystalline diamond material in which adjacent diamond crystals are bonded together; and
    a second layer which is joined at an interface with the first layer and comprising a mixture of diamond crystals and precemented carbide pieces pressed under sufficient heat and pressure to create composite polycrystalline material in which adjacent diamond crystals are bonded together to create polycrystalline diamond material which is bonded to the precemented carbide pieces, and in which second layer the polycrystalline diamond material and the precemented carbide pieces are interspersed in one another.

2. The composite polycrystalline body of claim 1 further comprising a substrate for supporting the composite polycrystalline body.

3. The composite polycrystalline body of claim 2 wherein the substrate is comprised of cemented carbide.

4. The composite polycrystalline body of claim 2 wherein the substrate is comprised of steel.

5. The composite polycrystalline body of claim 1 wherein the total volume percent of polycrystalline diamond material in the second layer is between 20 and 80.

6. The composite polycrystalline body of claim 1 wherein the total volume percent of polycrystalline diamond material in the second layer is between 35 and 45.

7. The composite polycrystalline body of claim 1 wherein the volume percent of polycrystalline diamond material varies in the second layer and generally decreases along a gradient in the direction away from the interface.

8. A composite polycrystalline body for engaging a work material comprising:
    a first layer with at least one exposed surface adapted for contacting the work material, said first layer comprising a first mixture of diamond crystals and precemented carbide pieces pressed under sufficient heat and pressure to create composite polycrystalline material in which adjacent diamond crystals are bonded together to create polycrystalline diamond material which is bonded to the precemented carbide pieces, and in which first layer the polycrystalline diamond material and the precemented carbide pieces are interspersed in one another; and
    a second layer which is joined at an interface with the first layer, and comprising a second mixture of diamond crystals and precemented carbide pieces pressed under sufficient heat and pressure to create composite polycrystalline material in which adjacent diamond crystals are bonded together to create polycrystalline diamond material which is bonded to the precemented carbide pieces, and in which second layer the polycrystalline diamond material and the precemented carbide pieces are interspersed in one another;
    said first layer having a volume percent of polycrystalline diamond material which is higher than the volume percent of polycrystalline diamond material in said second layer.

9. The composite polycrystalline body of claim 8 further comprising a substrate for supporting the composite polycrystalline body.

10. The composite polycrystalline body of claim 9 wherein the substrate is comprised of cemented carbide.

11. The composite polycrystalline body of claim 9 wherein the substrate is comprised of steel.

12. The composite polycrystalline body of claim 8 wherein the total volume percent of polycrystalline diamond material in the first layer is between 70 and 98.

13. The composite polycrystalline body of claim 8 wherein the total volume percent of polycrystalline diamond material in the second layer is between 2 and 70.

14. The composite polycrystalline body of claim 8 wherein the volume percent of polycrystalline diamond material is relatively uniform throughout the first layer.

15. The composite polycrystalline body of claim 8 wherein the volume percent of polycrystalline diamond material is relatively uniform throughout the second layer.

16. The composite polycrystalline body of claim 8 wherein the volume percent of polycrystalline diamond material varies in the first layer and generally decreases along a gradient in a direction away from the exposed surface and toward the interface.

17. The composite polycrystalline body of claim 16 wherein the volume percent of polycrystalline diamond material varies in the second layer and generally increases in a direction toward the interface.

18. A composite polycrystalline body for engaging a work material comprising a mixture of diamond crystals and precemented carbide pieces pressed under sufficient heat and pressure to create a composite polycrystalline body with an exposed surface adapted for contacting the work material, and in which adjacent diamond crystals are bonded together to create polycrystalline diamond material which is bonded to the precemented carbide pieces, and in which body the diamond crystals and the precemented carbide pieces are interspersed in one another; and in which the volume percent of polycrystalline diamond material varies in the composite body, and generally decreases along a gradient in the direction away from the exposed surface.

19. The composite polycrystalline body of claim 18 further comprising a substrate for supporting the composite polycrystalline body.

20. The composite polycrystalline body of claim 19 wherein the substrate is comprised of cemented carbide.

21. The composite polycrystalline body of claim 19 wherein the substrate is comprised of steel.

22. The composite polycrystalline body of claim 18 wherein the total volume percent of polycrystalline diamond material is between 20 and 80.

23. The composite polycrystalline body of claim 18 wherein the total volume percent of polycrystalline diamond material is between 40 and 50.

24. The composite polycrystalline body of claim 18 wherein the volume percent of polycrystalline diamond material at the exposed surface is between 90 and 100.

* * * * *